May 22, 1934.  W. W. GRANER  1,959,715
HAND OPERATED BRAKE TESTER
Filed Oct. 10, 1933     2 Sheets-Sheet 1
Fig. 1.
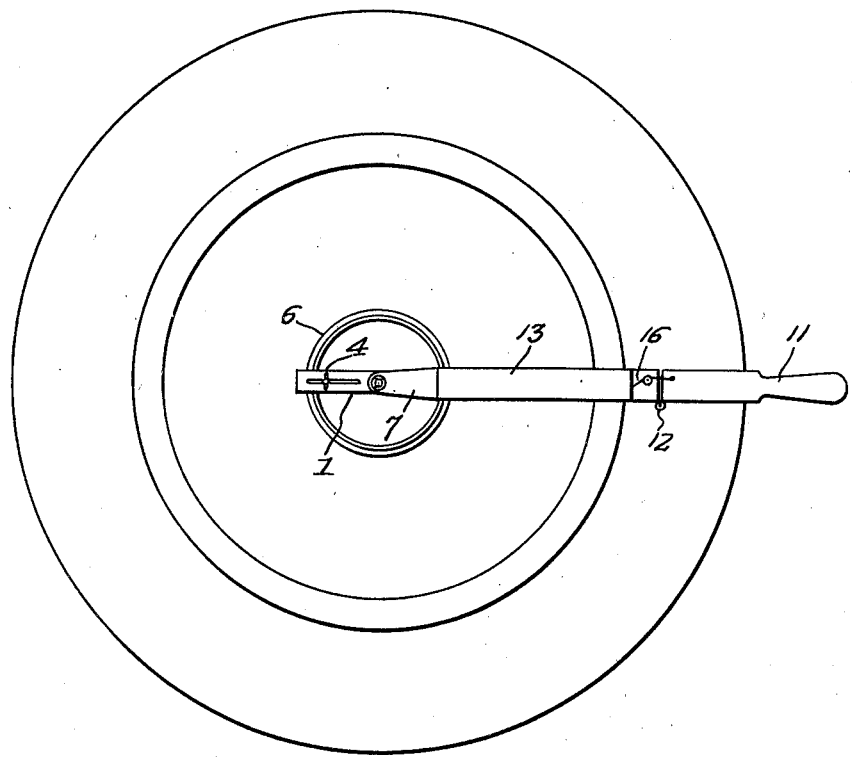
Fig. 2.
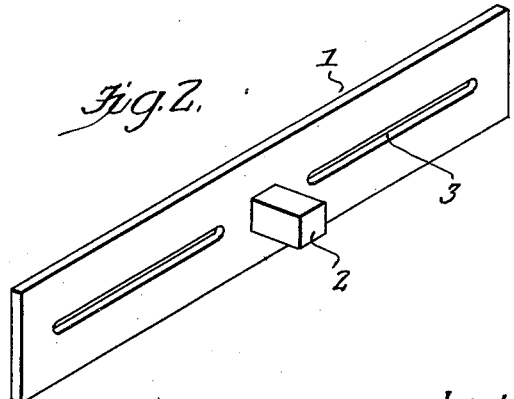
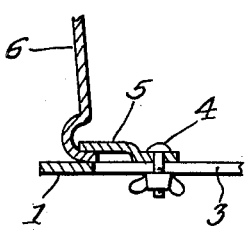
Fig. 3.
Inventor
W. W. Graner,
By Clarence A. O'Brien
Attorney

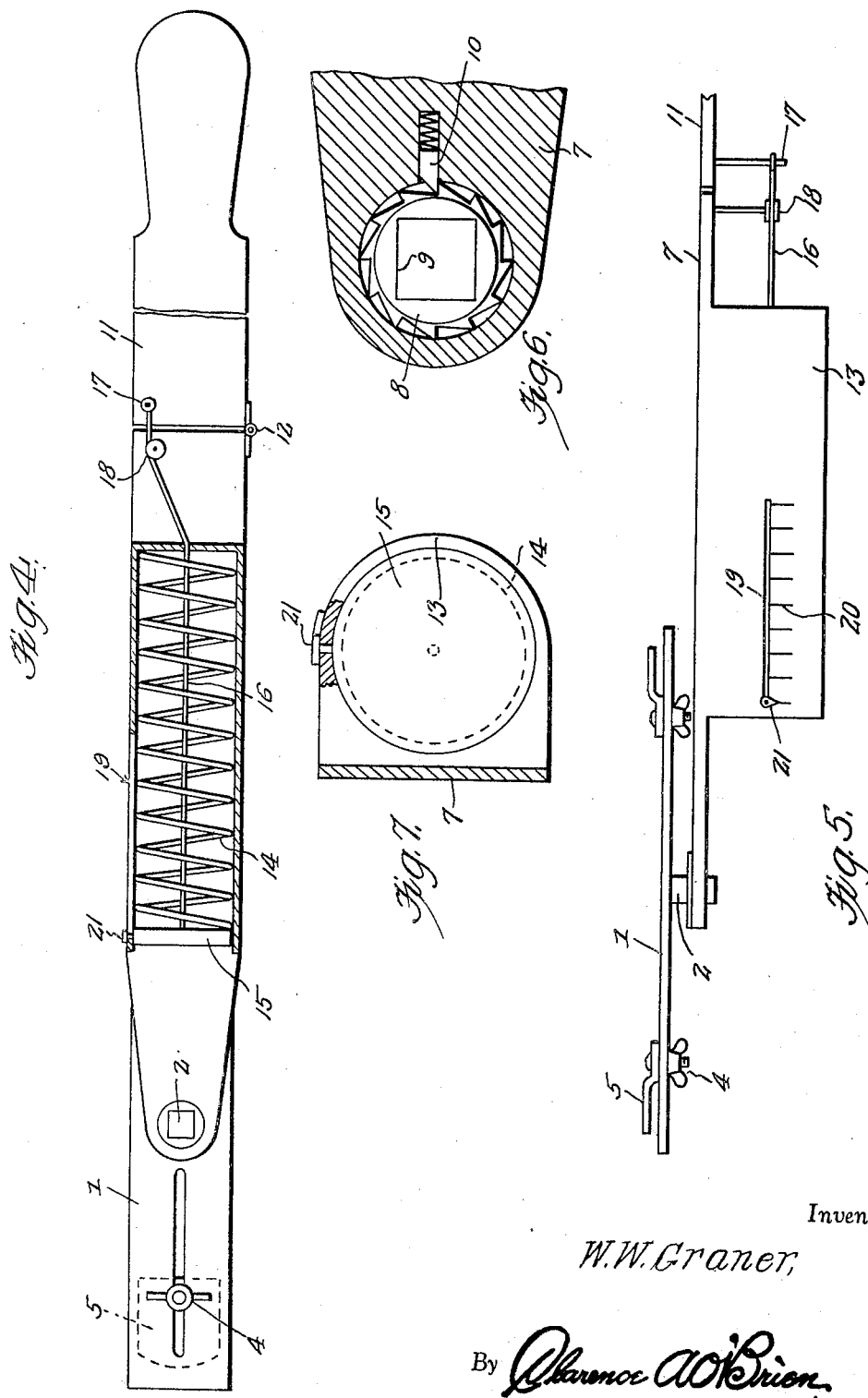

UNITED STATES PATENT OFFICE 1,959,715

HAND OPERATED BRAKE TESTER

Wyman W. Graner, Hastings, Minn.

Application October 10, 1933, Serial No. 693,025

2 Claims. (Cl. 265—1)

This invention relates to a brake tester, the general object of the invention being to provide a device of this nature which is of simple construction and one which can be operated by hand when attached to a wheel of a vehicle.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view showing the device attached to the hub of a vehicle wheel.

Figure 2 is a view of the plate which is used to connect the device to the hub.

Figure 3 is a sectional detail view showing how the plate is clamped to a part of the hub.

Figure 4 is an elevation with parts in section of the complete device.

Figure 5 is a side view of the complete device.

Figure 6 is a detail sectional view showing the ratchet means.

Figure 7 is an end view of the device, with parts in section.

In these drawings, the numeral 1 indicates an elongated plate provided with the centrally arranged stud 2 and the elongated slots 3. These slots receive the bolts 4 which connect the clamps 5 to the plate and these clamps are adapted to engage the rim of a vehicle wheel hub 6, as shown more particularly in Figure 3. It is, of course, understood that a pair of these clamps is used on the plate, as shown in Figure 5, so as to engage opposite portions of the bead of the hub.

A flat member 7 has an opening adjacent one end which contains a ratchet 8 provided with a non-circular hole 9 for receiving the stud 2 which is also of non-circular shape in cross section and a spring pressed dog 10 is carried by this end of the member 7 and engages the ratchet so that as the member 7 is oscillated with the opening 9 receiving the stud 2 and the plate 1 is attached to the hub of the wheel, the ratchet will be moved when the member 7 is moved in one direction so as to rotate the wheel through means of the plate 1 and its clamps, but when the member is moved in the other direction, the dog 10 will simply ratchet over the ratchet member 8. A handle 11 has one side edge hinged to the other end of the member 7 at the edge thereof, as shown at 12. A casing 13 is formed with or connected to the intermediate part of the member 7 and contains a spring 14 which bears against the closed rear end of the cylinder or casing and has its other end bearing against a piston 15 normally occupying a position adjacent the other end of the casing. A cable 16 is connected to the piston and passes through a hole in the rear end of the casing and is connected to the handle, as shown at 17, the casing passing over a guide pulley 18. A slot 19 is formed in the top part of the casing 13 and adjacent this slot, the casing is graduated, as shown at 20. A marker 21 is fastened to the piston 15 and has its shank extending through the slot.

Thus it will be seen that when the plate 1 is clamped to the hub of a wheel, after the hub cap has been removed and the wheel jacked up, by pressing downwardly upon the handle 11, the wheel will be turned as the spring 14 will resist movement of the piston 15 so that the parts tend to hold the handle 11 from moving on its hinge 12. As the parts are being operated, the brake adjustments are made and when the drag of the brake bands is sufficient to cause the spring 14 to give under the pull of the cable 16 on the piston 15, when the handle 11 is being pushed downwardly, the operator notices the graduation mark to which the marker 21 has moved, and when sufficient tension has been placed on the brake bands, the device is removed from the wheel and placed on another wheel and the brakes of this other wheel are adjusted until the marker 21 reaches the same graduation at which the brakes of the first wheel were adjusted.

Thus it will be seen that I have provided a simple device for testing brakes by hand.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A brake tester comprising a plate having a stud thereon, means for attaching the plate to a vehicle wheel, an elongated member having an opening adjacent one end for receiving the stud, a handle hinged to the other end of said member, a casing carried by said member, a piston therein, a spring in the casing for resisting movement of the piston, a cable connecting the piston to the handle at a point remote from the hinge thereof, and means for indicating the movement of the piston.

2. A device of the class described comprising a plate, means for clamping the same to a part of a vehicle wheel, a stud carried by the plate, an elongated member having an opening adjacent one end for receiving the stud, a handle hinged to the other end of said member, a casing connected with the member, a piston in the casing, a spring in the casing for resisting movement of the piston, a cable connecting the piston to the handle at a point remote from the hinge, said casing having a slot therein, graduations on the casing adjacent the slot, a marker associated with the graduations and having a stem passing through the slot and connected with the piston.

WYMAN W. GRANER.